US008807871B2

(12) United States Patent
Manno, Jr. et al.

(10) Patent No.: US 8,807,871 B2
(45) Date of Patent: Aug. 19, 2014

(54) SPECIALIZED LINED LANDFILL SYSTEM FOR THE STABILIZATION AND CONTAINMENT OF DRILLING WASTES AND COAL COMBUSTION RESIDUES

(76) Inventors: James Joseph Manno, Jr., Brookeville, PA (US); Jacqueline Lija Manno, Brookeville, PA (US)

(*) Notice: Subject to any disclaimer, the term of this patent is extended or adjusted under 35 U.S.C. 154(b) by 0 days.

(21) Appl. No.: 13/452,269

(22) Filed: Apr. 20, 2012

(65) Prior Publication Data

US 2012/0271091 A1    Oct. 25, 2012

Related U.S. Application Data

(60) Provisional application No. 61/483,727, filed on May 8, 2011, provisional application No. 61/483,057, filed on May 5, 2011, provisional application No. 61/571,777, filed on Apr. 22, 2011.

(51) Int. Cl.
| | |
|---|---|
| *B09B 1/00* | (2006.01) |
| *C04B 28/02* | (2006.01) |
| *C04B 7/24* | (2006.01) |
| *C04B 28/18* | (2006.01) |
| *B09B 3/00* | (2006.01) |
| *C04B 7/28* | (2006.01) |
| *C04B 111/00* | (2006.01) |

(52) U.S. Cl.
CPC .............. *C04B 28/18* (2013.01); *C04B 28/021* (2013.01); *C04B 7/243* (2013.01); *C04B 2111/00767* (2013.01); *B09B 3/0041* (2013.01); *C04B 7/28* (2013.01); *C04B 28/02* (2013.01); *B09B 2220/06* (2013.01)
USPC ................................ 405/129.45; 405/129.95

(58) Field of Classification Search
USPC ............................. 405/129.95, 129.45, 129.6
See application file for complete search history.

(56) References Cited

U.S. PATENT DOCUMENTS

| | | | |
|---|---|---|---|
| 3,557,876 A | 1/1971 | Tragesser | |
| 4,015,997 A | 4/1977 | Selmeczi et al. | |
| 4,668,128 A | 5/1987 | Hartley et al. | |
| 4,880,468 A * | 11/1989 | Bowlin et al. ................. | 106/706 |

(Continued)

FOREIGN PATENT DOCUMENTS

| | | |
|---|---|---|
| CN | 101486526 | 7/2009 |
| FR | 2874214 | 2/2006 |

OTHER PUBLICATIONS

US Environmental Protection Agency regulation; 40 CFR 258. Federal Register, vol. 65, No. 67. Apr. 6, 2000. p. 18014-18018.

(Continued)

*Primary Examiner* — John Kreck
(74) *Attorney, Agent, or Firm* — Matthew P. Frederick; Reed Smith LLP

(57) ABSTRACT

Systems and methods of the present invention include a method for the treatment of drilling wastes and coal combustion residues, comprising combining at least a first drilling waste with coal combustion residues to form a paste, combining at least a second drilling waste with coal combustion residues to form a compactable fill, and placing the paste and the compactable fill in a landfill. Other embodiments include a method of treating drilling wastes and coal combustion residues, comprising combining at least one drilling waste with a coal combustion residue to form a paste. Further embodiments include containing the paste within at least one geotextile container. Still further embodiments include placing the geotextile container in a landfill.

20 Claims, 3 Drawing Sheets

(56) References Cited

U.S. PATENT DOCUMENTS

| | | | |
|---|---|---|---|
| 4,913,585 A | | 4/1990 | Thompson |
| 5,040,920 A | * | 8/1991 | Forrester .................. 405/129.15 |
| 5,058,679 A | | 10/1991 | Hale et al. |
| 5,258,217 A | * | 11/1993 | Lewis ........................... 428/120 |
| 5,277,519 A | | 1/1994 | Nahm |
| 5,340,235 A | | 8/1994 | Milliken |
| 5,341,882 A | | 8/1994 | Hale |
| 5,358,049 A | | 10/1994 | Hale et al. |
| 5,423,379 A | | 6/1995 | Hale et al. |
| 5,430,237 A | | 7/1995 | Sharp |
| 5,551,806 A | | 9/1996 | Milliken |
| 5,584,792 A | | 12/1996 | Webster |
| 5,673,753 A | | 10/1997 | Hale et al. |
| 5,695,643 A | * | 12/1997 | Brandt et al. .................. 210/652 |
| 6,186,701 B1 | * | 2/2001 | Kempers ........................ 405/19 |
| 6,322,489 B1 | | 11/2001 | Richardson et al. |
| 7,059,805 B1 | * | 6/2006 | Addison, Sr. .............. 405/129.3 |
| 7,276,114 B2 | | 10/2007 | Polston |
| 7,371,277 B2 | | 5/2008 | Polston |
| 2004/0231560 A1 | | 11/2004 | Polston |
| 2006/0165320 A1 | | 7/2006 | Stephens |
| 2007/0003370 A1 | | 1/2007 | Liao |
| 2007/0221376 A1 | | 9/2007 | Solomon et al. |
| 2011/0108487 A1 | | 5/2011 | Cronia et al. |

OTHER PUBLICATIONS

Semach, Alexis Caryn. Geotextiles for use in Drainage Systems in Coal Combustion Product Landfills. Master of Science, Ohio State University, Civil Engineering, 2010.

Cowan, et al. Conversion of Drilling Fluids to Cements with Blast Furnace Slag: Performance Properties and Applications for Well Cementing. SPE Annual Technical Conference and Exhibition, Oct. 4-7, 1992, Washington, DC.

Leonard, et al. Stabilization/solidification of petroleum drill cuttings: Leaching studies. Journal of Hazardous Materials 174 (2010) 484-491.

Leonard, et al. Stabilization/solidification of petroleum drill cuttings. Journal of Hazardous Materials 174 (2010) 463-472.

Muntingh, et al. Utilising Fly Ash as a Salt Sinking Media Through Pasting with Industrial Brine. Proceedings of the World Congress on Engineering 2009 vol. I.

SiltTex Geotextile Tubes. Coastal Protection and Dewatering. www.geo-synthetics.com.

Voros, et al. Mine Reclamation Using Dredged Materials and Coal Ash.

* cited by examiner

SPECIALIZED LINED LANDFILL SYSTEM FOR THE STABILIZATION AND CONTAINMENT OF DRILLING WASTES AND COAL COMBUSTION RESIDUES

CROSS-REFERENCES TO RELATED APPLICATIONS

This application claims the benefit under 35 U.S.C. §119 (e) of the earlier filing date of U.S. Provisional Application Ser. No. 61/483,727 filed on May 8, 2011 and 61/483,057 filed on May 5, 2011 and 61/571,777 filed Apr. 22, 2011, the entire contents of all of these applications which are incorporated herein by reference, including any references cited therein.

BACKGROUND OF THE INVENTION

1. Field of the Invention

The present invention relates generally to the containment of wastes from industrial processes and to the stabilization and containment of drilling wastes and coal combustion residues specifically.

2. Description of the Background

The extraction of fossil fuels (e.g., coal, oil, and natural gas) from subterranean geologic formations is performed extensively around the world and provides the vast majority of the world's energy resources.

In the case of natural gas or oil, a small borehole is drilled from the surface to access the natural gas-containing formation and allow production of natural gas from the formation. Many geologic formations that contain natural gas also contain significant amounts of water that must be removed from the formation before the natural gas is able to escape to the borehole. To improve the productivity of such wells, fluids may be pumped into the formation at high pressure to create cracks or fractures in the formation, a process commonly referred to as hydraulic fracturing or simply "fracking" The natural gas escapes along these fractures thus increasing the productivity of the well.

At the present time, the state of Pennsylvania is in the early stages of what many believe to be a boom in the production of natural gas from various deep shale formations, such as the Marcellus Shale formations. Marcellus Shale is located at a depth of approximately 5,000 feet.

Drilling processes for accessing subterranean formations, including the Marcellus Shale formations, produce two primary and potentially hazardous waste streams—drill cuttings and drilling wastewater. These waste streams resulting from the drilling process used to access the formation are presenting novel and significant challenges to the state's waste disposal systems.

Drill cuttings are a mixture of soil, rock, and other subterranean matter brought to the surface during drilling of the well borehole, such as those drilled to access the Marcellus Shale. Drill cuttings are generally considered to be earthen material, however, they can become polluted when they come in contact with contamination sources common to the drilling process, such as drilling fluids or drilling mud. Drilling muds are routinely used to lubricate the drill and help remove cuttings from the wellbore. A mixture of chemicals and other constituents may be present in the drilling muds. Once drill cuttings come into contact with synthetic drilling muds or other sources of contaminants (e.g., oils and chemical additives), then the cuttings are considered to be a contaminated soil. In some instances, drill cuttings are disposed of onsite in pits or utilized in land applications. More commonly, drill cuttings are sent to landfills. Both of these disposal processes present environmental challenges and concerns.

The fluids that come back out of a well after it has been hydraulically fractured are called drilling wastewater. Wastewater is made of fluids from two distinct sources: the water that was pumped into the ground to be used to hydraulically fracture the well, and the water already present in the pores and cracks in the rock of the target formation (e.g., Marcellus Shale). There are two primary types of wastewater brine solutions generated in the shale formation gas production industry: 1) frac-flowback water, and 2) formation or produced water. Frac-flowback water is water that is returned to the surface from the well drilling and fracturing process. The flowback fluid is similar in composition to, though not exactly the same as, the fluid pumped down a well to fracture it and may contain substances such as flowback fracturing sand and other fracturing additives and chemicals. Formation water, or produced water, is the water from joints and pores in the Marcellus Shale formation itself. It was present before drilling and is removed from the geologic formation to allow efficient natural gas production from the well. Produced water is generated on an ongoing basis over the productive life of the well and contains a variety of naturally-occurring contaminants, including heavy metals, naturally occurring radioactive material, volatile organic compounds, and high levels of total dissolved solids. Because of the high salt content of the Marcellus Shale formation in particular, both frac-flowback and formation/produced water are highly contaminated saltwater that requires some form of treatment before being discharged or disposed of into the local environment.

Commonly, a chemical pre-treatment process is utilized to remove a limited number and amount of the pollutants typically present in the wastewater, resulting in a cleaner saltwater stream and a heavy metal sludge product, which is discussed further below. This process is currently being utilized to treat water for two primary purposes. The first is dilution and release of the brine water into waterways such as rivers, however, the practice of discharging treated water into waterways is currently being phased out by the Pennsylvania Department of Environmental Protection (PADEP) because of environmental concerns. The second use for chemically pre-treating the brine solution is for reuse in the fracturing process. In practice, the drilling industry finds that the chemically pre-treated water can only be reused a limited number of times in the fracturing process before it becomes necessary to dispose of the water.

Currently, the dominant technology for the treatment and ultimate disposal of water generated by the drilling process is evaporation. Evaporation is currently the only known technology used to meet many state-based dissolved solids limits for surface water discharge. Furthermore, the evaporation process generates not only clean water (which may itself be reused-/recycled for utilization in cooling towers or in the fracturing processes), but a necessary by-product is the creation of a concentrated brine solution that presents additional and unique disposal challenges. The concentrated brine solution is currently and primarily being: 1) disposed of in injection wells, 2) temporarily stored on-site in large storage tanks and lined ponds, or 3) crystallized with the intent of being used for beneficial projects such as road salt. As previously noted, the discharge of drilling fluids to surface bodies of water is not listed because it is currently being phased-out by local environmental protection departments. Additionally, the first approach (i.e., to dispose of brine solution by injection into deep well sites) has a questionable future in many areas because of the limited number of injection wells currently available due to geology-related concerns as well as recent links to earthquakes generating near injection well sites. The second approach, storing the brine in on-site tanks or ponds, offers only a temporary solution to the water issue. The third approach of a membrane- or evaporation-based treatment of the brine water followed by a crystallization process to produce solidified or highly concentrated salt products for commercial use may be utilized to treat the brine. Unfortunately, the market for beneficial salt is currently limited and insufficient to justify the significant energy requirements and capital investment required for a widespread crystallization infrastructure. Thus, these methods do not offer a long-term solution to the problem of treating large volumes of such fluids.

Concentrated brine solutions cannot be disposed of in existing solid waste landfill systems due to its high salt concentration. Any leakage or discharge of this highly concentrated brine would adversely affect the characteristics of generated landfill leachate by increasing its salinity. Standard municipal landfill facility water or treatment systems are not currently designed to accept or to effectively treat brine-based water.

As noted above, the chemical pre-treatment of brine water at centralized facilities or on-site at the well pad area produces water with minimal total suspended solids for reuse in the fracturing process. The waste streams from this process include not only the concentrated brine solution, discussed above, but also sludge, which typically contains heavy metal contaminants and radioactive particles. This heavy metal sludge, also sometimes referred to as pre-treatment sludge, is currently being sent to standard municipal landfills. However, such landfills are ill-equipped to handle this sludge due to heightened environmental risks resulting from the contaminants. In Pennsylvania, the current municipal landfills are projected to become overwhelmed in the near future as the production of gas from shale formations, and thus the waste streams associated with that production, dramatically increases.

In addition to natural gas, a second major fossil fuel used to satisfy energy needs is coal. Among many other uses, coal is typically burned at power plants to generate electricity and results in multiple ash-based waste streams. Fly ash is comprised of the fine particles that rise with the flue gas and are subsequently removed from the flue gas through various separation processes. Depending on the source and makeup of the coal being burned, the components and nature of the fly ash that is generated can vary. All fly ash, however, includes substantial quantities of toxic substances.

In addition to the fly ash removed from the flue gas, bottom ash falls directly from the combustion process to the bottom of the burner. Presently, both of these coal combustion residues (CCR) are being disposed of primarily in unlined landfills or impoundments. Even though fly ash has not previously been regulated by the U.S. Environmental Protection agency (EPA) as a hazardous waste, community and environmental organizations have documented numerous environmental contamination and damage concerns arising from CCR. For example, CCR that have not been encapsulated and are currently stored in unlined landfills have been found to leach arsenic, mercury, lead, and other toxic heavy metals into groundwater. Further, improperly constructed slurry impoundments, such as the one that failed in December 2008 in Kingston, Tenn., can spill onto and contaminate hundreds of acres of land and miles of waterways. It is anticipated that, based upon recent EPA publications, the manner in which CCR are regulated may change in the near future. The predominant thinking at this time is that fly ash and other CCR will soon be classified as a type of hazardous waste which will require that it ultimately be disposed of in lined landfill systems or that some other environmentally acceptable disposal method be utilized.

Unfortunately, as described above, there are no viable long-term solutions currently being utilized in the drilling and mining industries that provide for the environmentally acceptable and cost-effective disposal of these major waste streams produced by two major fossil fuel industries. The environmental impact of these waste streams on states such as Pennsylvania, where the related industries are active, is reaching crisis levels.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

SUMMARY OF THE INVENTION

Figure 1:
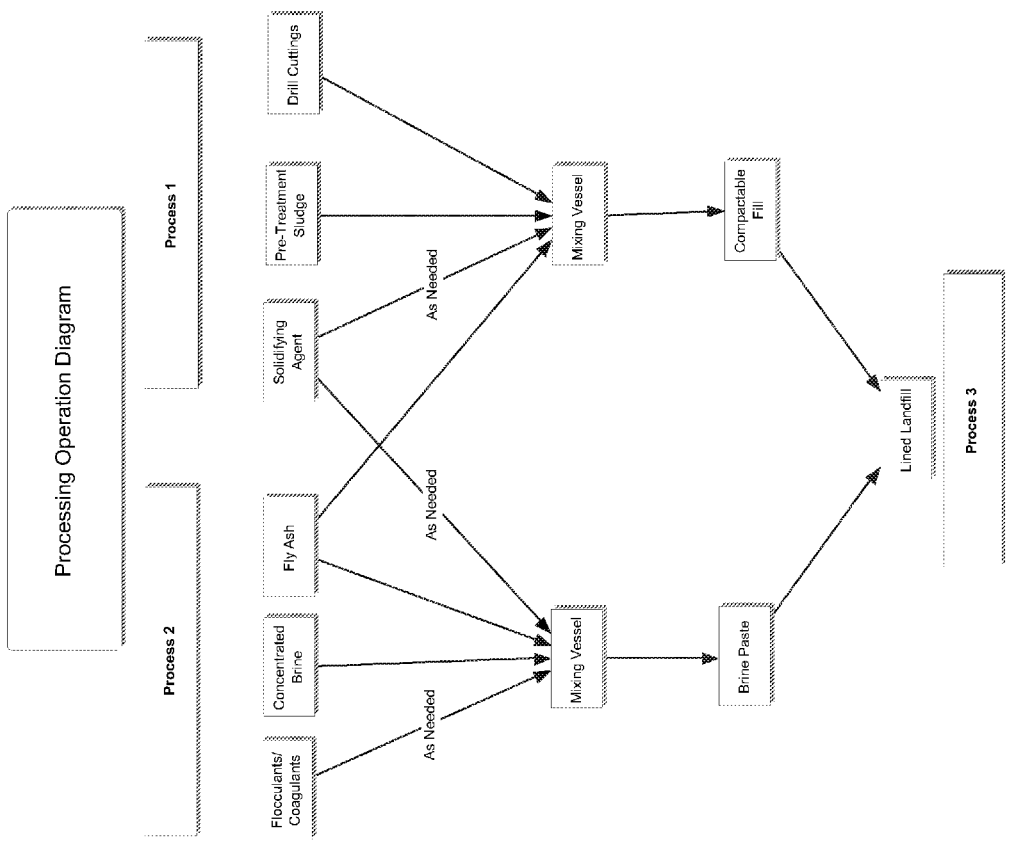
FIG. 1 shows an embodiment of a processing operation diagram of the present invention.

The present invention is directed to systems and methods for the combined disposal of drilling waste streams and coal combustion residues (CCR). In certain embodiments, the system is implemented as a specially designed landfill capable of sequestering brine and other gas production-related contaminants with CCR. Specifically, waste products such as drill cuttings, brine solutions, heavy metal sludge, and CCR may be combined and placed into a stable and environmentally acceptable landfill. Such a landfill can readily be constructed in a manner to ensure zero or near-zero waste discharge and to virtually eliminate the impact of two major waste streams on the environment. The present invention provides a significant benefit of containing waste as well as providing opportunities for an economically feasible and environmentally stabile disposal system.

The present invention results in a zero or near-zero discharge system that simultaneously provides (A) a safe, environmentally acceptable, and cost-effective method of disposing of the waste products such as concentrated brine solution, drill cuttings, sludge, and recovered or returned drilling mud generated by the natural gas industry; and (B) a safe and environmentally acceptable method for the disposal of CCR such as fly ash, bottom ash, boiler slag and scrubber residues. In some embodiments, the final product resulting from the combination of one or more of the waste streams may be readily placed, compacted, and contained in landfills.

Various embodiments are summarized here and are discussed in more detail, below. In one embodiment, the present invention preferably combines pozzolanic waste or CCR (e.g., fly ash or bottom ash) with a liquid waste stream (e.g., drill cuttings or brine) in a compactable material. Where the waste stream cannot be solidified quickly enough to achieve stability without unduly delaying the landfill operation, the combined waste stream may be inserted into geotextile containers. In some embodiments, the geotextile containers may over time routinely become embedded in horizontal layers. In some embodiments, the moisture that is initially present in the combined waste stream in the geotextile containers leaches into the surrounding compacted fill, thereby resulting in solidified fill inside the tubes and a stable and environmentally effective overall landfill. In some embodiments, the combination of the extremely low permeability of the compacted layers combined with the eventual solidifying of the paste conveyed either into the landfill or into the geotextile containers produces a landfill that has long term stability, low permeability, zero or near-zero waste discharge and is thus environmentally desirable and acceptable. In some embodiments, a solidifying agent such as lime activator may be added to the mixing process (as needed) or during either the placing of the compacted layers in the landfill or the filling of the geotextile containers as necessary to promote the solidification process.

In one embodiment, the specialized lined landfills of the present invention follow basic design guidelines of current landfill construction with several adaptations that allow it to sequester brine and other gas production-related contaminants with CCR. These adaptations may include any one or more of the following: 1) the use of a specific water treatment system for the purpose of treating brine water that is being accepted into the system, as well as brine water leachate that may be generated by the system; 2) the inclusion of mixing/pasting facilities on-site to effectively combine waste streams (e.g., concentrated brine and fly ash) to create stabilized fill; 3) the use of geotextile containers for containment of paste within the landfill system; and 4) the location of the landfill in close proximity to one of the primary waste sources (e.g., power plants, current fly ash stockpiles).

DETAILED DESCRIPTION OF THE INVENTION

It is to be understood that the figures and descriptions of the present invention have been simplified to illustrate elements that are relevant for a clear understanding of the invention, while eliminated for purposes of clarity, other elements may be well known. The detailed description will be provided hereinbelow with reference to the attached drawings.

The present invention encompasses systems and methods for the combined disposal of drilling waste streams and coal combustion residues (CCR). By providing an efficient and environmentally stabile means for the disposal of waste products from two important energy-producing processes, the present invention represents a significant improvement over the prior art.

The disposal of waste products that are generated from drilling operations (e.g., natural gas, oil and coal) as well as from coal-fired power plants are addressed by the present invention. The present invention encompasses a landfill system for stabilization and containment of drilling-generated wastes and coal combustion residues ("CCR"). In presently preferred embodiments, the system primarily addresses four types of waste products currently generated within those industries: (1) brine solution; (2) drill cuttings; (3) heavy metal sludge; and (4) fly ash and/or bottom ash. The present invention may employ all four of these waste products or combinations thereof, as described more fully herein below.

Pozzolanic wastes, or CCR, suitable for use within the scope of the present invention include fly ash, bottom ash, boiler slag, scrubber residues and any other CCR. In some embodiments, CCR may include carbon capture brine. As coal-fired power plants implement sulfur dioxide and nitrogen oxide control mechanisms, the scrubber residues produced by those processes may also be employed within the context of the present invention. The fly ash and other CCR that are utilized to generate compactable fill may come directly from a coal-fired power plant. Alternatively, they may be reclaimed from CCR that was previously placed in unlined landfills or other unlined ash disposal systems. The CCR may also be utilized dry or wetted with a liquid additive (e.g., fresh water, brine, or drill cuttings).

In other embodiments, the landfills of the present invention may also accommodate carbon capture and sequestration systems. Specifically, the brine solution destined for the landfills of the present invention may first be utilized as part of a carbon capture process at the power plant or other facility designed to capture $CO_2$ emissions. The resulting $CO_2$-rich brine may then be incorporated into the landfill for permanent $CO_2$ sequestration. This carbon capture brine may be used in a similar manner to the brine obtained from drilling wastewater as described herein.

Drilling wastes suitable for use within the scope of the present invention include any waste from the drilling process. In certain embodiments, the drilling wastes include drill cuttings and brine. As used herein, drill cuttings may include earthen material and waste products such as drilling mud or drilling fluid, drilling wastewater, sand, and other sources of contaminants such as oils and chemical additives. As used herein, drilling wastewater may include brine solution, concentrated brine solution, heavy metal sludge, and pre-treatment sludge.

As used herein, the term brine solution may refer to brine, treated brine, concentrated brine, and any other brine from a drilling and/or coal combustion process. In some embodiments, brine includes concentrated brine from an evaporative or membrane-type treatment process. In some embodiments, brine includes waste brine from another process, such as carbon capture brine from a coal combustion process. In still further embodiments, other types of waste liquids may be used.

Certain embodiments of the present invention include mixing an agent with the CCR and/or the drilling wastes. In some embodiments, the agents include solidifying agents, flocculants, coagulants, and combinations of any thereof. In further embodiments, the solidifying agents include lime, lime activator, lime kiln dust, Portland cement, and any other agent that aids in the solidification of a water or solvent-based system, including for example, epoxies and other resins.

Figure 2:
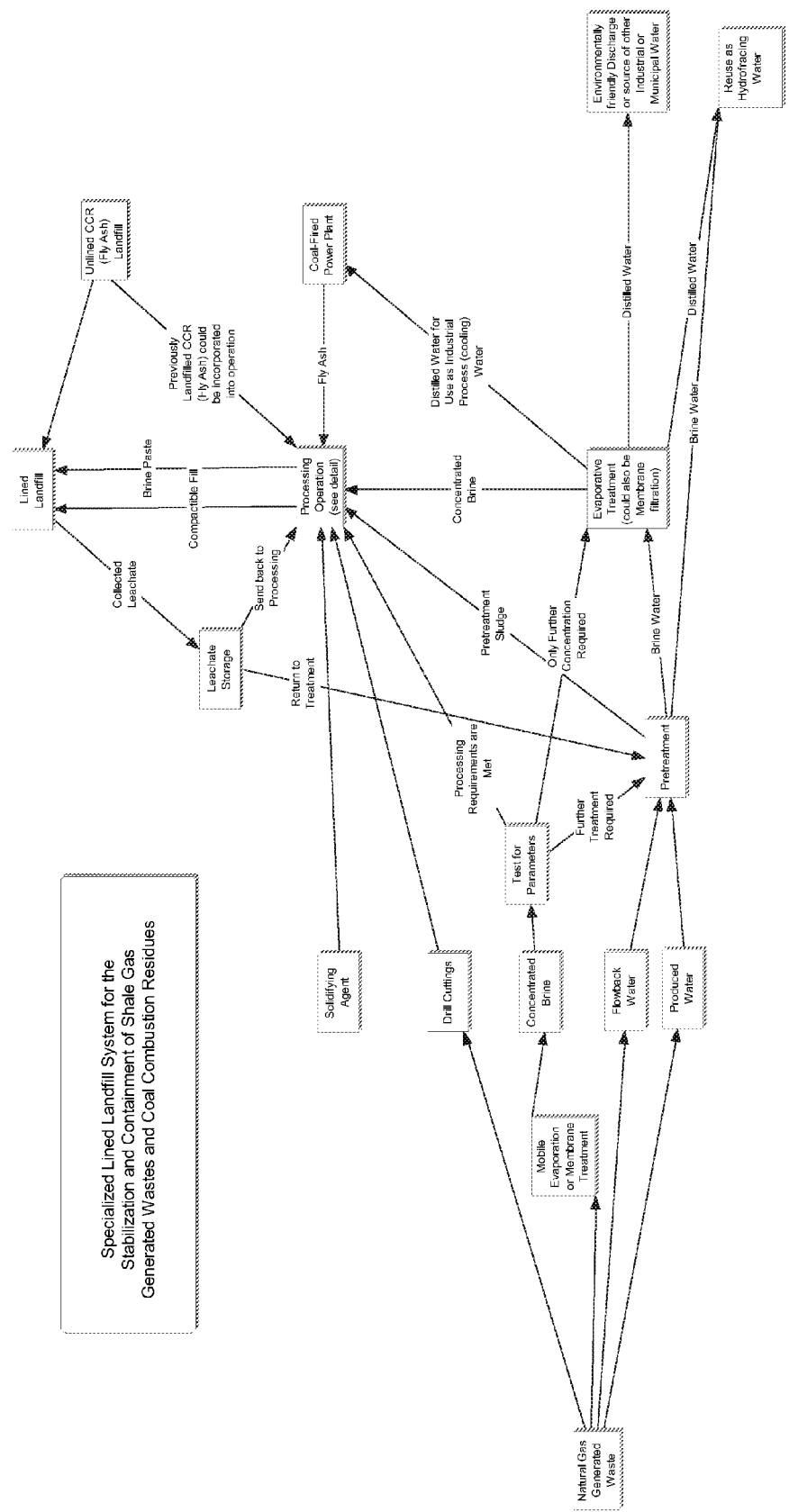
FIG. 2 shows an embodiment of an overall diagram of the system of the present invention.

One embodiment of the present invention encompasses methods where waste streams are treated in two independent processes, the output of which is combined to produce stabile compactable fill to be placed into a lined landfill. Process 1 centers on the combination of drill cuttings and/or heavy metal sludge with CCR (e.g., fly ash and/or bottom ash) and a solidifying agent (as needed) to create a compactable fill. Process 2 combines brine solution with CCR and other agents as needed such as solidifying agents, flocculants, and coagulants to create a paste. In this embodiment, the products of Process 1 and Process 2 may then be combined in a single containment system. One embodiment of combining Processes 1 and 2 is shown in FIG. 1. FIG. 2 shows a more expansive embodiment, including the sources of the waste and various options for treating, reusing, and/or landfilling the wastes.

Process 1 encompasses the production of a compactable fill that is comprised of combinations of drill cuttings and/or heavy metal sludge, CCR, and solidifying agents as needed. CCR are capable of forming a cementitious substance through a chemical reaction between the CCR and the other waste. The resulting mixture hardens during this chemical reaction, becoming cement-like. The drill cuttings and/or heavy metal sludge preferably provide the water for the chemical reaction. However, untreated brine, concentrated brine, and/or water may also be utilized.

The fill produced through Process 1 preferably possesses low permeability so that the compacted mass will sequester potential contaminants within the fill for an extremely long period of time. The desired and proper blend of components may be achieved utilizing commonly employed industrial machinery such as concrete mixers or other means of mechanical mixing. Under certain circumstances, acceptable fill properties may be obtained by mixing various CCR and drilling wastes utilizing a farm-type disk or rotary tiller or similar in-place mixing device instead of or in addition to the mixing vessels. This compactable fill is capable of being hauled, spread, and compacted with normal earthmoving and compaction equipment, and can be utilized as structural fill for slopes, benches, and overall structure of the landfill. In other embodiments, the compactable fill may also be utilized to construct paste containment areas.

Process 2 encompasses the creation of a paste from the combination of a brine solution, CCR, and solidifying agent, as needed. The paste may also be referred to as flowable fill, slurry, sludge, etc. The properties of the paste may be adjusted as need such that the past may have a low viscosity (e.g. a slurry that flows easily), or a high viscosity (e.g. a paste that does not flow easily). The brine solution used in this process may consist of any brine solution or drilling wastewater as described herein. The process generates a paste that may harden/solidify over time and effectively sequesters contaminants within the mixture. In certain embodiments, the paste contains more brine and other liquids than the compactable fill. To adjust the physical properties (e.g., slump characteristics) of the paste, various agents may be added to the mixture. The resulting paste possesses a low permeability, effectively sequesters salt and other potential contaminants within the paste, and is of appropriate viscosity so that it may be pumped or otherwise conveyed into geotextile containers, or other containment systems such as pits.

In other embodiments, the effective disposal of the compactable fill and pastes generated through processes 1 and 2 is achieved by the present invention by placing them into a landfill. Numerous configurations and methods for the effective filling of the specialized lined landfill are considered within the scope of the present invention. For example, the paste may be placed into horizontally arranged geotextile tubes and fixed there using the compactable fill from Process 1. In other alternative embodiments, the compactable fill may form the containment structure that allows the paste-filled geotextile tubes to be placed and stacked in a staggered manner. In another preferred embodiment, compactable fill may be unnecessary and the specialized landfill might only be filled with paste-filled geotextile tubes. In other embodiments, the fill creates pits or containers for the paste.

Some embodiments include a method for the treatment of drilling wastes and coal combustion residues, comprising combining at least a first drilling waste with coal combustion residues to form a paste, combining at least a second drilling waste with coal combustion residues to form a compactable fill, and placing the paste and the compactable fill in a landfill. In certain embodiments, the first and second drilling waste is selected from the group consisting of drill cuttings, brine solution, concentrated brine solution, sludge, and combinations thereof. In other embodiments, the first drilling waste is selected from the group consisting of brine solution, concentrated brine solution, and combinations thereof. In still further embodiments, the second drilling waste is selected from the group consisting of heavy metal sludge, drill cuttings, brine solution, concentrated brine solution, and combinations thereof. In other embodiments, an agent is added to either the paste or the fill. In certain embodiments, the agent selected from the group consisting of solidifying agents, flocculants, coagulants, and combinations of any thereof. In some embodiments, the coal combustion residue is selected from the group consisting of fly ash, bottom ash, boiler slag, scrubber residues, carbon capture brine, and combinations of any thereof. In other embodiments, the paste is placed within at least one geotextile container within the landfill. In still further embodiments, the geotextile containers are placed in the landfill with compactable fill. In other embodiments, the compactable fill forms a pit or holding area for the paste.

Geotextile containers are made from high-strength geotextiles and are a proven technology in the area of material management. In some embodiments, the geotextile containers are made from permeable or semi-permeable, high-strength fabrics. The fabrics are made from high strength, stable materials such as polypropylene or polyester. In one embodiment, the containers are fabricated from two or more pieces of geotextile fabric laid over one another and sewed along the edges to create a self-contained bag. The purpose for using geotextile containers within the context of the present invention is for containment of the paste as it hardens. The geotextile containers allow for some water and other liquids to drain or evaporate from the paste over time, while at the same time maintaining a structure for the paste. In certain embodiments, the geotextile containers may be constructed of different materials (e.g., water impermeable materials such as plastic bags) or formed in different shapes to help achieve desirable goals or characteristics of the specialized lined landfill, such as tubes or spheres.

Geotextile containers are typically employed to dewater certain materials such as liquid waste, sludge or dredge, or to form coastal and wetland structures such as containment dikes and breakwaters. The permeable nature of the geotextile containers allows the material inside the containers to dry as water escapes the permeable fabric, while the fabric contains the solids left behind. In embodiments of this invention, however, the geotextile containers contain a paste while it solidifies, with the benefit of trapping the harmful brine while minimizing how much brine escapes the geotextile container. Without limiting the embodiments herein, it is believed that the reduced surface area presented by placing the paste in a geotextile container reduces the amount of brine that leaches out of the paste as it solidifies. The geotextile containers may minimize "bleed" of the brine while holding the form of the geotextile container. As used herein, geotextile containers allow for efficient handling and placement of paste.

Certain embodiments of the invention include a method of treating drilling wastes and coal combustion residues, comprising combining at least one drilling waste with a coal combustion residue to form a paste. Creating a paste out of these wastes maximizes brine absorption, while still allowing the mixture to solidify. Further embodiments include containing the paste within at least one geotextile container. Still further embodiments include placing the geotextile container in a landfill. In certain embodiments, the geotextile container comprises a geotextile tube. In other embodiments, the drilling waste is selected from the group consisting of drill cuttings, brine solution, concentrated brine solution, heavy metal sludge, and combinations of any thereof. In some embodiments, the coal combustion residue is selected from the group consisting of fly ash, bottom ash, boiler slag, scrubber residues, and combinations of any thereof. Certain of these embodiments include combining a drilling waste and a coal combustion residue with an agent selected from the group consisting of solidifying agents, flocculants, coagulants, and combinations of any thereof. In these embodiments, the geotextile containers may be placed in the landfill with or without compactable fill.

In some embodiments, geotextile containers filled with paste are placed in a landfill. In certain embodiments, the containers are oriented horizontally within the landfill. This allows the continued placement of compacted fill in horizontal layers around the tubes that will encapsulate and fix the tubes within the landfill. Other embodiments include creating impoundments or other structures out of geotextile containers filled with paste. These impoundments may contain compactable fill, pools of paste, or other waste.

The present invention does not require all of the waste products described above (i.e., drill cuttings, heavy metal sludge, brine solution, and CCR) in each embodiment. In some presently preferred embodiments, only fly ash and concentrated brine solution may be employed to produce a paste for pumping into geotextile tubes for landfilling in a specialized landfill with the tubes surrounded by other, more commonly employed landfill materials. In other preferred embodiments, a facility may only use drill cuttings or heavy metal sludge mixed with fly ash for the containment system. Depending on the products and concentrations of each waste product being processed, other agents may be employed. Numerous combinations of elements may be effectively encapsulated and stabilized for long periods of time. As an additional example, the paste produced by the combination of brine and fly ash may harden sufficiently quickly so that geotextile tubes need not be employed. In other embodiments, the paste or compactable fill may include other waste streams, such as concrete salt blocks, contaminated soil, sludge, dredge, or municipal solid waste.

The landfill of the present invention may be any landfill, or it may include a lined landfill such as a municipal landfill. The lined landfill systems of the present invention may also include leachate capturing and recovery systems for the collection and recycling of rainwater or other fluid flow from the landfill. At the end of the filling procedures, the landfill will be preferably capped for long-term stability.

In still further embodiments, the landfill may be a specialized lined landfill created for containing drilling and/or coal combustion wastes. The specialized lined landfill may include special systems such as a treatment system capable of handling brine leachate, and mixing facilities for Processes 1 and 2. Certain embodiments of the present invention include collecting leachate from the lined landfill. Still further embodiments include treating the leachate with a method selected from the group consisting of evaporative treatment, membrane-type treatment, and combinations thereof.

In some embodiments, a layer of CCR such as fly ash may alternatively be placed on the top layer of the specialized lined landfill system and brine solution may be sprayed over it. This layering method may effectively sequester the brine solution and provide a cost-effective method of disposal without the need for mixing a paste solution and placing in geotextile tubes.

Through the creation of compactable fill and paste through the above-described processes, the present invention may produce limited leachate. Both the compactable fill and the paste harden over time into fixed cementitious materials. These hardened materials produced solidified fill and a harmonious, stable, and environmentally acceptable overall landfill. In certain embodiments, the combination of the extremely low permeability of the compacted horizontal layers with the eventual solidification of the paste, which may be placed in geotextile tubes, produces a zero or near-zero waste discharge. The solidified waste produces minimal leaching of contaminants that are contained in their component parts, thus reducing the total volume of leachate that needs to be addressed. Any leachate that is produced will preferably be captured in a leachate collection system and temporarily stored at the site. The leachate may be treated through an evaporation or membrane-type treatment system. Alternatively, the leachate may be reintroduced to the landfill through either process 1 or process 2 described above. In that manner, the specialized lined landfill system achieves zero or near-zero waste discharge.

The landfills of the present invention may employ additional components to achieve appropriate disposal and treatment of the waste streams. For example, the landfills of the present invention may include an on-site treatment system that is fully capable of adjusting the brine water concentration for the most desirable pasting/mixing concentration. The present invention may also employ an evaporative or membrane-type process that allows brine leachate to be treated to produce a concentrated brine and clean water. The on-site treatment systems (both pre-treatment and evaporative processes) may be utilized to treat water for profit as well as for introduction to the system. For example, any clean water generated from the treatment system can be sent back for beneficial use at the power plant, reuse in the drilling industry, municipal use, or release into the environment.

An additional benefit of the present invention arises from the fact that due to the nature of the materials within the lined landfills of the present invention, it is expected that there will be a reduction in or elimination of methane gas produced by the landfill. Accordingly, the landfills of the present invention may optionally include a gas collection system, though in some implementations a gas collection system may not be needed at all.

The landfills of the present invention may have an added benefit for cost effectiveness should they be constructed in proximity to existing power plants to obtain use of CCR from power plants for use in the system. Certain embodiments may also include proximity to existing unlined fly ash landfills that could potentially be reutilized into or alongside this process. In certain embodiments, proximity to an existing wastewater treatment facility that produces concentrated brine is also beneficial. A further embodiment includes proximity to a source of inexpensive power or waste energy (e.g. near a compressor station, power plants, flare gas from landfills, etc.). In still further embodiments, the landfill may be constructed in close proximity to a drilling site or an area with many drilling sites.

Certain embodiments of the present invention include a system for treating drilling wastes and coal combustion residues, comprising (a) a source of drilling waste, (b) a source of coal combustion residue, (c) a mixing plant for forming at least one of a paste and a compactable fill, the paste and compactable fill comprising the drilling waste and coal combustion residue, and (d) a lined landfill for landfilling at least one of the paste and compactable fill.

EXAMPLES

FIG. 1 shows one embodiment of the present invention. FIG. 1 includes an embodiment of Process 1, wherein drilling wastes including drill cuttings and pre-treatment sludge are combined with fly ash and solidifying agents, as needed, in a mixing vessel to make compactable fill. FIG. 1 also includes an embodiment of Process 2, wherein brine and fly ash are combined with other agents as needed in a mixing vessel to form a paste. In this embodiment, the fill and the paste are combined in a lined landfill.

FIG. 2 shows an embodiment of a system of the present invention. A drilling site generates wastes including drilling wastewaters that are pre-treated and may be discharged or re-used as fracking water. The wastewaters may alternatively be used in Process 1 and/or 2 to form fill and/or paste. Similarly, the drill cuttings from the drilling site are used in Process 1 and/or 2. The CCR for Processes 1 and/or 2 are provided in this embodiment by a coal-fired power plant or an existing fly ash landfill. Any leachate from fill and/or paste in the lined landfill may be recycled into pretreatment and/or used directly in Process 1 and/or 2.

Figure 3:
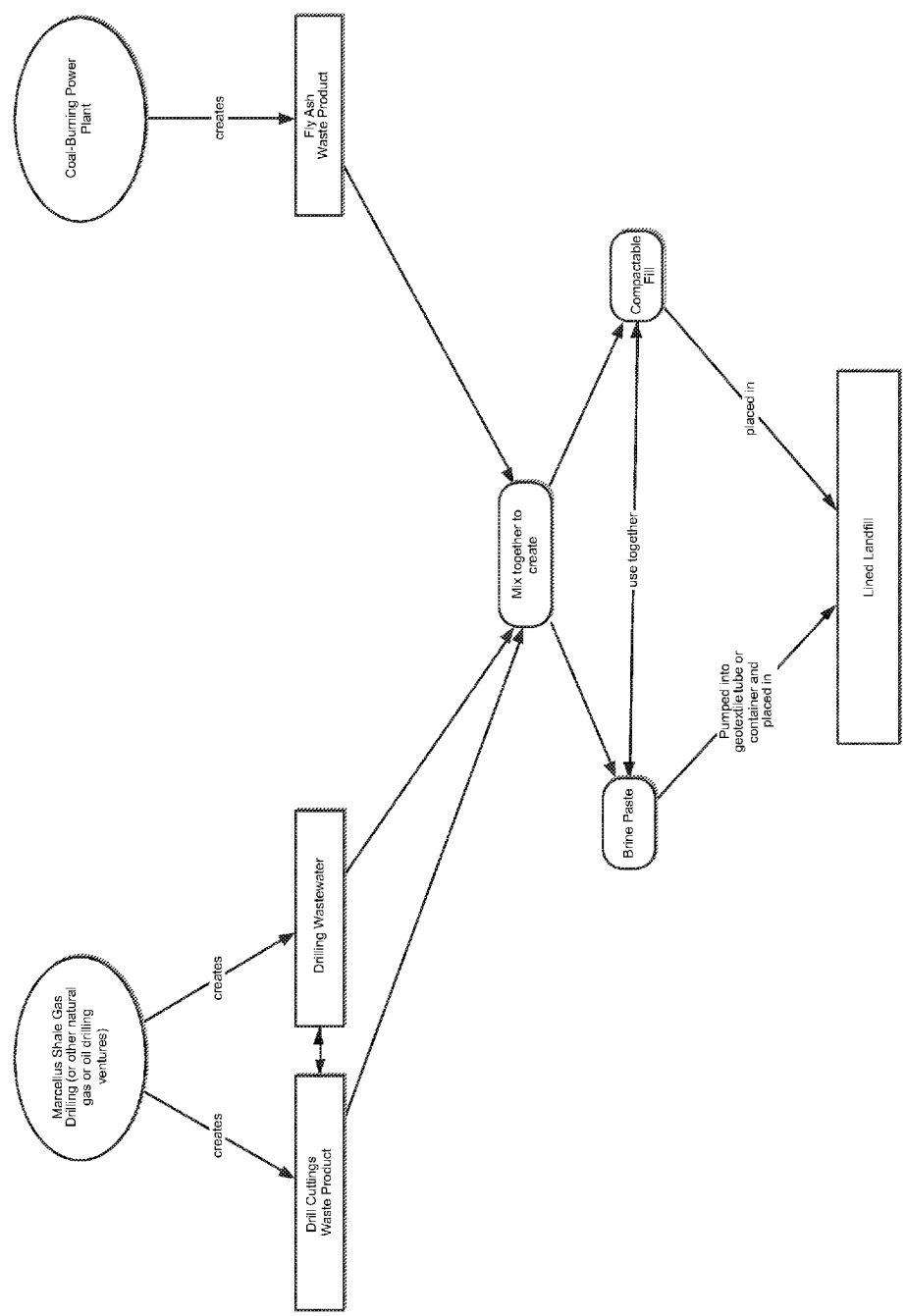
FIG. 3 shows an embodiment of a system of treating drilling and CCR wastes of the present invention.

FIG. 3 shows an embodiment of the system of the present invention. This system includes a source of drilling waste, a source of coal combustion residue and a mixing plant for forming at least one of a paste and a compactable fill. The paste and compactable fill are placed in a lined landfill for landfilling at least one of the paste and compactable fill.

Nothing in the above description is meant to limit the present invention to any specific materials, geometry, or orientation of elements. Many substitutions are contemplated within the scope of the present invention and will be apparent to those skilled in the art. The embodiments described herein were presented by way of example only and should not be used to limit the scope of the invention.

We claim:

1. A method for the treatment of drilling wastes and coal combustion residues, comprising:
   (a) combining at least a first drilling waste with coal combustion residues to form a paste;
   (b) combining at least a second drilling waste with coal combustion residues to form a compactable fill; and
   (c) combining the paste and the compactable fill in a lined landfill, wherein the compactible fill forms a containment system for the paste.

2. The method of claim 1, wherein said first and second drilling waste is selected from the group consisting of drill cuttings, brine solution, concentrated brine solution, sludge, and combinations of any thereof.

3. The method of claim 1, wherein the first drilling waste in step (a) is selected from the group consisting of brine solution, concentrated brine solution, and combinations of any thereof.

4. The method of claim 1, wherein the second drilling waste in step (b) is selected from the group consisting of heavy metal sludge, drill cuttings, brine solution, concentrated brine solution, and combinations of any thereof.

5. The method of claim 1, further comprising adding an agent to at least one of steps (a) and (b), the agent selected from the group consisting of solidifying agents, flocculants, coagulants, and combinations of any thereof.

6. The method of claim 1, wherein said coal combustion residue is selected from the group consisting of fly ash, bottom ash, boiler slag, scrubber residues, carbon capture brine, and combinations of any thereof.

7. The method of claim 5, wherein the solidifying agent is selected from the group consisting of lime, Portland cement, lime activator, lime kiln dust, and combinations of any thereof.

8. The method of claim 1, wherein step (c) further comprises containing the paste within at least one geotextile container within the lined landfill.

9. The method of claim 1, further comprising collecting leachate from the lined landfill.

10. The method of claim 9, further comprising treating the leachate with a method selected from the group consisting of evaporative treatment, membrane-type treatment, chemical treatment, and combinations of any thereof.

11. The method of claim 1, wherein the containment system comprises a containment structure.

12. The method of claim 1, wherein the first drilling waste in step (a) is selected from the group consisting of brine solution, concentrated brine solution, drill cuttings, and combinations of any thereof.

13. The method of claim 1, further comprising an additional treatment step comprising treating at least one of the first and second drilling wastes.

14. The method of claim 13, wherein the additional treatment step is performed before steps (a), (b) and (c).

15. The method of claim 14, wherein at least some of a product of the additional treatment step is not used in steps (a), (b) and (c).

16. The method of claim 13, wherein the additional treatment step is selected from the group consisting of chemical treatment, evaporative treatment, membrane treatment, and combinations of any thereof.

17. The method of claim 13, wherein said first and second drilling wastes are selected from the group consisting of drill cuttings, brine solution, concentrated brine solution, sludge, and combinations of any thereof.

18. The method of claim 1, wherein the coal combustion residues comprise coal combustion residues reclaimed from an area selected from the group consisting of a landfill, an ash disposal system, and combinations of any thereof.

19. The method of claim 18, wherein said coal combustion residues are selected from the group consisting of fly ash, bottom ash, boiler slag, scrubber residues, carbon capture brine, and combinations of any thereof.

20. The method of claim 1, wherein at least one of the paste and the compactable fill further comprises leachate.

* * * * *

UNITED STATES PATENT AND TRADEMARK OFFICE
CERTIFICATE OF CORRECTION

PATENT NO. : 8,807,871 B2
APPLICATION NO. : 13/452269
DATED : August 19, 2014
INVENTOR(S) : James Joseph Manno, Jr. and Jacqueline Lilja Manno Page 1 of 1

It is certified that error appears in the above-identified patent and that said Letters Patent is hereby corrected as shown below:

Title Page
item (76) on the first page of the patent

1) For both inventors the city should be spelled BROOKVILLE

2) The second inventor middle name should be spelled LILJA

In the Specification

1) Column 7, Line 21, the second word should be "needed", as opposed to need

2) Column 7, Line 21, the sixth word should be "paste", as opposed to past

In the Claims

1) In Claim 1, Column 11, Line 33, the fourth word should be "compactable", as opposed to compactible Signed and Sealed this
Sixth Day of January, 2015

Michelle K. Lee
*Deputy Director of the United States Patent and Trademark Office*